United States Patent [19]
Bott et al.

[11] Patent Number: 5,143,628
[45] Date of Patent: Sep. 1, 1992

[54] METHOD OF THE DEWATERING OF SLUDGE

[75] Inventors: Reinhard Bott, Waldbronn; Robert Kern, Weingarten; Thomas Langeloh, Mühlhausen; Holger Gross, Wörth, all of Fed. Rep. of Germany

[73] Assignee: G. Siempelkamp GmbH & Co., Krefeld, Fed. Rep. of Germany

[21] Appl. No.: 691,315

[22] Filed: Apr. 25, 1991

[30] Foreign Application Priority Data

Apr. 28, 1990 [DE] Fed. Rep. of Germany ....... 4013786

[51] Int. Cl.$^5$ .................... B01D 25/12; B01D 25/32
[52] U.S. Cl. ..................... 210/770; 100/37; 100/122; 210/225; 210/791
[58] Field of Search ............ 210/224, 770, 507, 783, 210/400, 225, 226, 227, 780, 791; 100/36, 37, 126, 127, 122, 113, 114

[56] References Cited

U.S. PATENT DOCUMENTS

| | | | |
|---|---|---|---|
| 1,500,124 | 7/1924 | Hale | 100/122 |
| 1,696,474 | 12/1928 | Dutzmann | 100/126 |
| 2,330,625 | 9/1943 | Reppman | 100/114 |
| 4,459,907 | 7/1984 | Sundman | 100/122 |
| 4,826,607 | 5/1989 | Pearce | 210/770 |
| 4,853,121 | 8/1989 | Heinrich et al. | 210/225 |
| 5,030,360 | 7/1991 | Grainger et al. | 210/770 |
| 5,051,194 | 9/1991 | Bähr | 210/770 |

*Primary Examiner*—Robert A. Dawson
*Assistant Examiner*—Sun Uk Kim
*Attorney, Agent, or Firm*—Herbert Dubno

[57] ABSTRACT

A sludge volume of difficult to dewater sludge is subdivided in a sludge dewatering press into fractional volumes which are self-draining even at press pressures of 50 bar and more. The partitions are water-permeable and form water channels for conducting the expressed liquid away from the sludge volume.

10 Claims, 2 Drawing Sheets

METHOD OF THE DEWATERING OF SLUDGE

FIELD OF THE INVENTION

Our present invention relates to a method of and to an apparatus for the dewatering of sludge and especially sludge which is difficult to dewater, utilizing the pressing of sludge between two surfaces in a dewatering press.

BACKGROUND OF THE INVENTION

Sewage sludge and sludge from other sources frequently must be dewatered for further processing, e.g. drying prior to incineration, for composting or for disposal. One of the dewatering methods used is the pressing of the sludge in a dewatering press to form a sludge cake, a sludge volume being thereby compressed to express the water therefrom.

Some sludges have been characterized as difficult to dewater and include sewage sludges derived from biological water and sewage treatment plants. Other difficult to dewater sludges include so-called hydroxide sludges, sludge containing fats and protein components, e.g. as derived from food processing waste-water treatment, and sludges which are formed in electro-mechanical processes, i.e. so-called galvanotechnical sludges.

A characteristic of difficult to dewater sludges is that the interstitial passages of the sludge volume, through which the water must drain upon pressing, tend to block or plug at an early stage in the pressing so that even a substantial increase in the pressing pressure will not express the desired amount of water from the sludge.

To overcome this drawback, it is known to provide dewatering auxiliaries or agents, for example so-called drainage agents, in the sludge volume. These drainage agents may be granular substances or short fibers, for example short segments of monofilament synthetic resin fibers, which are mixed into the sludge volume, are statistically distributed therein and are not connected to the sludge dewatering press. These drainage agents maintain interstitial channels in the sludge volume during compression.

Since the drainage agents are consumable, they add considerably to the cost of the process and, because they must be disposed of with the filter cake, increase the volume of material which must be handled for disposal. This is particularly a problem when a drainage agent includes short segments of plastic fibers which may not readily decompose in a land fill.

Analysis of the dewatering process has shown that the drainage agents form uniform passages or micropassages throughout the filter volume even at high pressures, enabling the expressed water to run off. Nevertheless, the degree of dewatering is unsatisfactory, and it has been found that when high dewatering pressures of, for example, 10 bar and higher are used, there are still limits in the amount of water which can be expressed so that the use of drainage agent particles in the sludge volume does not solve the problem fully.

OBJECTS OF THE INVENTION

It is, therefore, the principal object of the present invention to provide an improved method of dewatering a sludge, especially a sludge which can be classified as difficult to dewater, whereby the aforementioned drawbacks are eliminated, high pressures can be used effectively to express greater amounts of water from the sludge, and disposal problems are not created by the method.

Another object of this invention is to provide a simple and economical method for a more complete dewatering of sludge, especially difficult to dewater sludge.

Still another object of this invention is to provide an improved apparatus for dewatering a sludge, especially a dewatering press, which can be used to carry out the improved method.

SUMMARY OF THE INVENTION

These objects and others which will become apparent hereinafter are attained, in a method of dewatering a sludge volume, especially of a sludge which is difficult to dewater, which comprises subdividing the sludge volume with flexible partitions into autodraining or self-draining volume regions or fractions which remain drainable even at elevated pressures well above 10 bar and even in excess of 50 bar, the partitions contracting by flexible deformation in an uncontrolled manner, e.g. by the formation of folds, as the sludge volume is compacted to form the cake.

According to a feature of the invention, the sludge cake can then be broken up by the stretching of the partitions to enable separation of the sludge cake from the partitions so that the sludge cake can be disposed of without any increase in volume of the material disposed of.

More particularly, the method of the invention can comprise the steps of:

(a) introducing a volume of sludge to be dewatered into a dewatering press between two relatively movable surfaces adapted to press the sludge volume between them;

(b) subdividing the sludge volume into autodraining volume fractions with flexibly deformable partitions uncontrollably contracting upon compression of the sludge volume;

(c) compressing the sludge volume subdivided by the partitions with a dewatering pressure in excess of 10 bar between the surfaces to express water from the sludge, contract the partitions and form a sludge cake; and (d) thereafter extending the partitions to break up the sludge cake and recover the partitions therefrom.

Difficult to dewater sludges, which have extremely fine particles which might tend to plug the interstices of sludge volume when the thickness of the sludge volume to be compressed is substantial, can be handled with ease according to the invention because the thicknesses of the regions into which the partitions subdivide the sludge volume can be so small that substantial blockage of the interstices of these volume fractions cannot occur. The method is applicable to sludge containing the finest of particles and where the filter cake pores are normally so small that conditioning of the sludge is necessary to permit expression of water through the filter cake.

The invention is based upon our observation that, the dewatering of sludge, and especially sludges which have been classified as difficult to dewater, is normally dependent upon the thickness of the sludge cake.

The thicker the sludge cake in conventional systems, the smaller is the degree of dewatering, even with increasing pressures. In other words, this negative effect of increased thicknesses cannot be compensated by higher dewatering pressures. The results can only be improved slightly by the incorporation of the aforementioned drainage agents. A partly dewatered sludge, in a relatively thick sludge cake, loses the ability to be further dewatered under pressure and, in a partially compacted form can no longer be dewatered by pressing because it no longer is self draining.

By subdividing the sludge volume into thin sludge cakes whose individual "thickness" for a given dewatering pressure is such that there is no significant obstruction of dewatering, a higher degree of dewatering of the entire sludge volume can be achieved. Of course, it is possible to accomplish a similar result without the partitions of the invention by simply decreasing the sludge volume in the press so that the threshold thickness at which further dewatering ceases as a practical matter is not achieved, but this would increase the number of press cycles required for a given sludge volume, decrease the capacity of the apparatus and thus significantly increase the operating and capital cost for the dewatering of a given volume of sludge in a given time.

According to the invention, therefore, the sludge volume to be compressed is internally so subdivided by the partitions that the volume regions between the partitions or volume fractions form uniformly thin sludge cakes which remain dewaterable, i.e. maintain their autodraining or self-draining capacity.

With the invention, therefore, there is a substantial improvement in the dewatering. The dewatering degree in the system of the invention increases with increasing pressure over a wide range. Of special advantage is the fact that after the formation of the sludge cake, the same partitions can be extended to break up the sludge cake. The pieces of the sludge cake can thus be discharged readily from the press and disposed of without any increase in the volume of the material requiring disposal by reason of the absence of drainage agents therein. The partitions are reusable and can remain in the dewatering press, being connected to the relatively movable surfaces thereof, including, for example, the press piston. It is self understood that the partitions will be generally brushed, flushed, sprayed or otherwise cleaned prior to reuse in the pressing of another sludge volume.

It has been found to be advantageous to have the partitions extend fully across the sludge volume from one side to the opposite side thereof and preferably in the direction of movement of the movable wall, i.e. the piston.

The partitions can have a spacing parameter or construction such that the volume fractions are themselves layers and preferably the partitions are liquid permeable so that the fractions or compartments into which the partitions subdivide the sludge volume, communicate between themselves through the partitions.

It has been found that the partitions should be so constructed and arranged that the volume fractions have a thickness of less than 5 mm, i.e. the spacing across surfaces of the partitions filled with the material to be compacted should be less than 5 mm.

In the case where the partition is formed as compressible tubes, the thickness represents the diameter of the tubes and should also be less than 5 mm. Preferably the spacing parameters and distribution structure should be so selected that the autodraining volume regions have a thickness or a diameter of less than 3 mm.

The invention operates preferably with a dewatering pressure above 10 bar and most preferably with a dewatering pressure in excess of 50 bar. Substantially higher pressures can be used as higher degrees of dewatering are desired. The partitions can preferably form drainage channels and, for this purpose, the water can also be pressed from the sludge volume along the partitions. The invention also can operate with a sludge volume which is transformed into a foam state during or with dewatering.

According to an apparatus aspect of the invention, a dewatering press can comprise:

two relatively movable surfaces adapted to receive the sludge volume between them;

means for displacing at least one of the surfaces to press the sludge volume between the surfaces with a dewatering pressure in excess of 10 bar and form a sludge cake from the sludge volume; and a plurality of flexible deformable partitions in the sludge volume subdividing the sludge volume in autodraining volume fractions and uncontrollably contracting upon compression of the sludge volume, the partitions being thereafter extendable to break up the sludge cake and enable recovery of the partitions therefrom.

BRIEF DESCRIPTION OF THE DRAWINGS

The above and other objects, features and advantages of the present invention will become more readily apparent from the following description, reference being made to the accompanying drawing in which.

SPECIFIC DESCRIPTION

Figure 1:
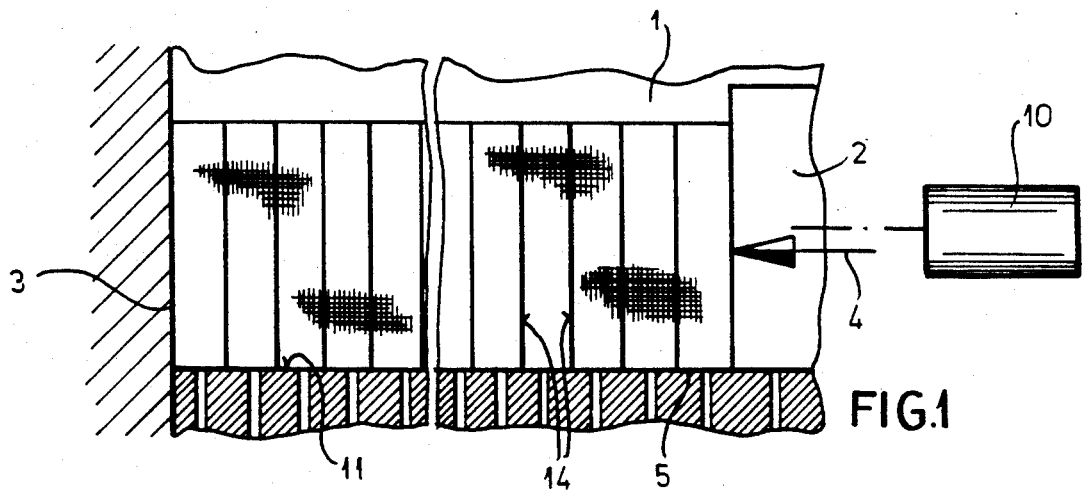
FIG. 1 is a highly diagrammatic view of a vertical section of a dewatering press in the region of the sludge-receiving compartment.
Figure 2:
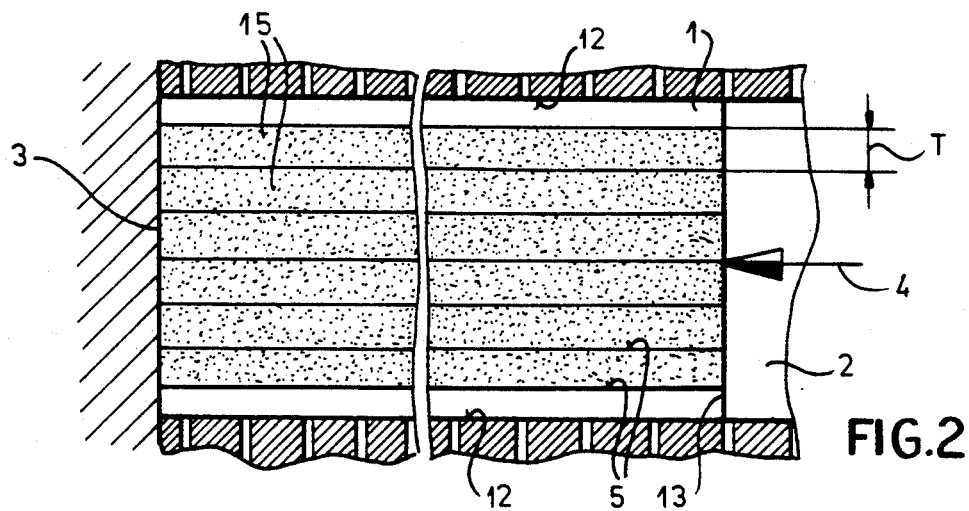
FIG. 2 is a plan view, also in section, of the press of FIG. 1.
Figure 3:
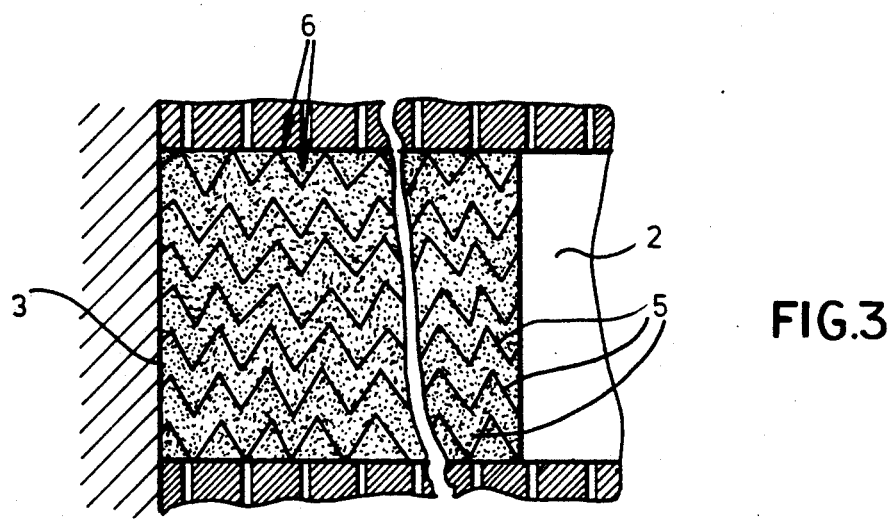
FIG. 3 is a view similar to FIG. 2 showing the sludge volume in a compressed state.
Figure 4:
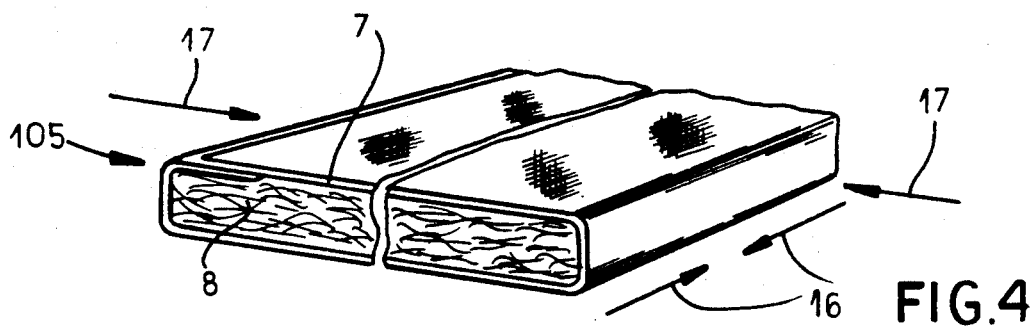
FIG. 4 is a perspective view of a partition according to the invention for a dewatering press.

In FIGS. 1-3 we have shown a sludge dewatering press which comprises a sludge-receiving chamber 1 defined between a stationary surface or wall 3 and a movable surface formed by a press piston which can be displaced in the direction of the arrow 4 by a hydraulic cylinder or the like as represented at 10 and generating the press pressure. The chamber 1 can also be defined between a perforated floor 11 and perforated side walls 12.

The chamber 1 is subdivided internally by water-permeable partitions 5, which can be composed of a nonwoven, woven or knitted fabric and which can be anchored to the wall 3 and the surface 13 of the piston 2 defining the chamber 1 between them. As has been indicated at 14, the partitions 5 can be formed with crease lines with respect to which the partitions 5 can form folds as shown at 6 in FIG. 3.

The partitions 5 define compartments or volume compartments 15 between them which can have thicknesses T as little as 5 mm and preferably smaller than 3 mm in the case in which especially difficult to dewater sludges are employed.

In principle, the partitions 5 subdivide the sludge volume introduced into the sludge-receiving chamber 1 into autodraining volume fractions 15. The sludge volume is reduced with expression of the water and flexible deformation of the partitions 5 forming the folds 6 to a dewatered sludge cake (compare FIGS. 2 and 3). The dewatering pressure should be in excess of 10 bar and preferably in excess of 50 bar. Once the dewatering has been completed, the piston 2 can be retracted so that the extension of the partitions will cause the filter cake to be broken up and thus to be removed, leaving the partitions in place.

Instead of webs, as is the case in which the partitions are fabrics, the partitions can also be made up of planar arrays of threads, yarns, strings or wires which can be deformed more randomly as the piston is advanced, textile strips or the like which can be provided with the preferential fold lines, or any combination thereof. Preferably the partitions are water-permeable to form water channels.

FIGS. 4–8 show other partition constructions which may be used. For example, the partition 105 of FIG. 4 may comprise a filtrate-conducting water-permeable inner layer or core 8 surrounded by a filter layer of fabric forming the outer layer 7. The porous and water permeable structure of FIG. 5 can be contracted in the direction of the arrows 16 or in the direction of the arrows 17 as desired and will randomly compress. The fabric 7 prevents the solids from coming into contact with the core 8 and thus forms a solids-retention layer. The partition 105 of FIG. 4 forms a drainage strip within the sludge volume. Thus it is apparent that in all embodiments, the partitions 5 can form channel-like filtrate paths through which the filtrate can be discharged at a rate determined by the pressure differential thereacross.

The solids-retention layer 7 can itself be formed as a single layer or as a multilayer structure of a woven or knitted fabric with sufficient density. The filtrate conducting layer 8 can also be provided as a fine-pore fabric or knit. It can also be composed of monofilaments, e.g. as a nonwoven mass.

Figure 5:
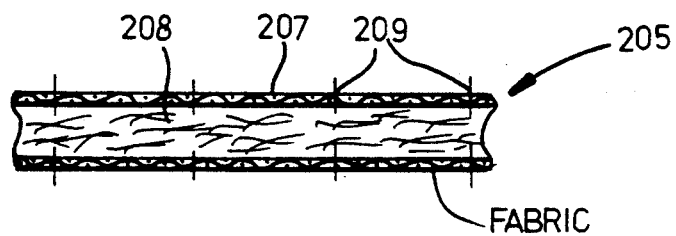
FIG. 5 is a cross section through another embodiment of a partition
Figure 6:
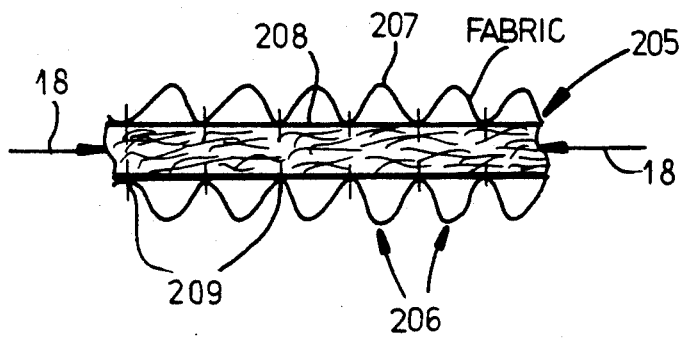
FIG. 6 is an illustration of the partition of FIG. 5 in a partly compressed state.

In the embodiment of FIGS. 5 and 6, the partition 205 can comprise a core 208 to which the fabric envelope 207 is stitched at 209 so that folds or corrugations 206 can be formed in the envelope fabric. The envelope fabric constitutes a solids-retention fabric as described in connection with FIG. 4, while the permeable mass 208 forms a drainage path for the filtrate when the partition is contracted in the direction of the arrows 18. The corrugations 206 resulting from the intentional fold attachment zones 209 causes the partition to operate like the partitions 5 in FIGS. 3 and, as the partitions are extended again, causes break-up of the filter cake.

Figure 7:
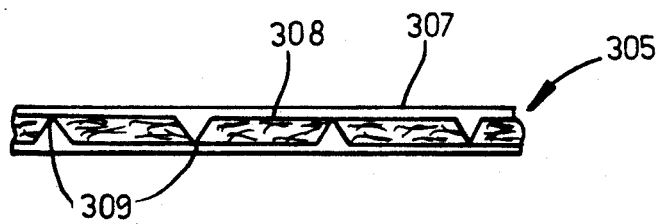
FIG. 7 is a cross section through another embodiment of a partition.
Figure 8:
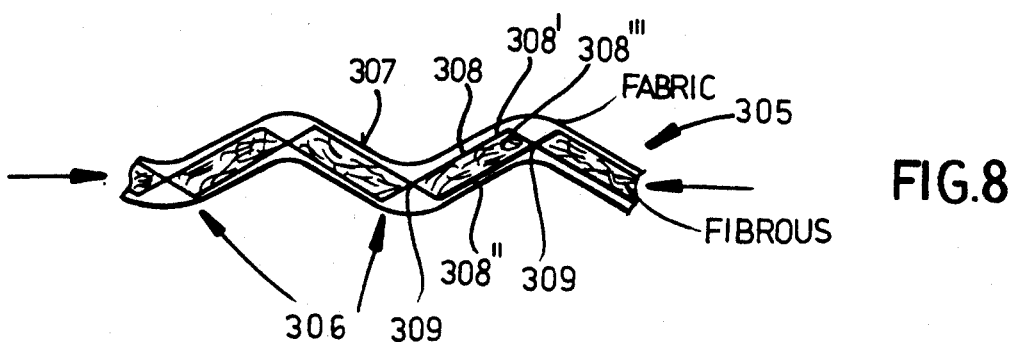
FIG. 8 is another cross section which shows the partition of FIG. 7 in another position.

In the embodiments of FIGS. 7 and 8, the core 308 is formed from water-permeable material in bands connected at intentional fold zones 309 between layers 307 of the envelope fabric. The intentional fold regions 309 can be film joints connecting layers 308' and 308'' of perforated thermoplastic films flanking the fibrous permeable material 308'''.

As the process is closed, therefore, the partition 305 of FIG. 7 compresses to form the undulating configuration of FIG. 8. Both the solids-retention layers 307 and the filtrate-conducting layers 308 can be composed of plastic filaments or threads. Zigzag folds or corrugations can be formed at 306 in the partition as seen in FIG. 8.

We claim:

1. A method of dewatering a sludge, comprising the steps of:
    (a) introducing a volume of sludge to be dewatered into a dewatering press between two relatively movable surfaces comprising a wall and a movable surface formed by a press piston adapted to press said sludge volume between them;
    (b) subdividing said sludge volume into autodraining volume fractions with flexibly deformable partitions uncontrollably contracting upon compression of said sludge volume;
    (c) compressing said sludge volume subdivided by said partitions with a dewatering pressure in excess of 10 bar between said surfaces to express water from said sludge, contract said partitions and form a sludge cake; and
    (d) thereafter extending said partitions to break up said sludge cake and recover said partitions therefrom.

2. The method defined in claim 1 wherein said partitions extend at least from one side of said sludge volume to an opposite side thereof in said dewatering press.

3. The method defined in claim 1 wherein said partitions extend in a direction of compression of said sludge volume between said surfaces.

4. The method defined in claim 1 wherein said partitions subdivide said sludge volume into layer-shaped autodraining volume fractions.

5. The method defined in claim 1 wherein said partitions are permeable to water, said autodraining volume fractions communicating being in fluid connection through said partitions.

6. The method defined in claim 1 wherein said partitions are constructed and distributed in said sludge volume so that said autodraining volume fractions have a thickness of less than 5 mm.

7. The method defined in claim 6 wherein said partitions are constructed and distributed so that said autodraining volume fractions have a thickness of less than 3 mm.

8. The method defined in claim 1 wherein, in step (c), said sludge volume is compressed with an dewatering pressure in excess of 50 bar between said surfaces to form said sludge cake.

9. The method defined in claim 1 wherein said partitions are water permeable to form drainage channels in said sludge volume.

10. The method defined in claim 1 wherein said sludge volume is transformed into a foamy state.

* * * * *